United States Patent Office 2,766,240
Patented Oct. 9, 1956

2,766,240

PREPARATION OF SUBSTITUTED PTERIDINES

John Geraci, New York, N. Y., assignor to Aries Laboratories, Inc., New York, N. Y., a corporation of New York No Drawing. Application October 27, 1953,
Serial No. 388,668

8 Claims. (Cl. 260—251.5)

This invention relates to a novel process for the preparation of substituted pteridines. More particularly, it relates to a new process for the preparation of substituted 6-aminomethyl pteridines from a pyrimidine, an aldehyde, and an amine.

Specifically, the new process comprises the interaction of 2,4,5-triamino-6-hydroxy-pyrimidine, propargyl aldehyde or an acetal thereof, and a primary or secondary amine. A ring closure is effected resulting in the formation of a substituted pteridine according to the following general equation:

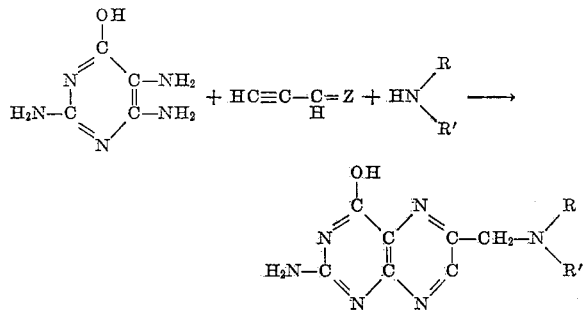

In the above equation Z represents an oxygen atom or two ether groups, and R and R' represent aromatic or aliphatic substituents, one of them possibly being hydrogen.

The products resulting from the practice of this invention are useful as growth factors in the cultivation of certain microorganisms and in stimulating the formation of haemoglobin in higher forms of animal life. Other compounds possess anti-vitamin activity and are therefore useful in bio-assays and as antagonists. Still others find utility as intermediates in the preparation of compounds having vitamin-like activity.

Of the reactants, 2,4,5-triamino-6-hydroxy-pyrimidine is a commercially available compound and can readily be prepared by syntheses described in the literature. In its place its tautomeric forms, such as

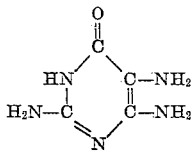

and

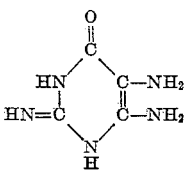

may be utilized and as hereinafter referred to, it is intended that 2,4,5-triamino-6-hydroxy-pyrimidine include as well any of the tautomeric forms.

As amines which form the side chain of the substituted pteridines any primary or secondary amines may be employed. These include aliphatic amines such as methylamine, ethylamine, ethanolamine, isopropylamine, isopropanolamine, dimethylamine, diethylamine, diethanolamine, diisopropylamine, diisopropanolamine, mixed amines, and the like. A preferred class of amines includes the aromatic amines such as aniline and its substitution products. Particularly desirable products result from the use of amino benzoic acids and especially amides of p-aminobenzoic acid formed from the corresponding acid halide and an amine such as ethylamine, ethanolamine, ethylhexylamine, morpholine, and the like.

Amides of amino benzoic acid with amino acids give rise to a class of compounds having folic acid activity, an especially beneficial property. These amides include p-aminobenzoylglutamic acid, p-aminobenzoylglutamyl glutamyl glutamic acid, p-aminobenzoylglutamyl glycyl glutamic acid, and others having a plurality of peptide linkages. Other amino acids such as aspartic acid, leucine, alanine, isovaline, cystine, and the like, may appear in the peptide chain. These may be present in the d, l, or dl form and since they contain unreacted functions they may be further combined as esters or salts in the practice of the invention.

The third reactant propargyl aldehyde, serves to close the ring and link the pyrimidine and side chain. In place of propargyl aldehyde its acetals may be employed, such as those of the lower alkanols. It appears, however, that the acetals hydrolyze in the course of the reaction liberating the free aldehyde and reference to reacting the aldehyde is therefore inclusive of the use of either the free aldehyde or its acetals. Propargyl aldehyde is commercially available and can readily be prepared from acetylene and formaldehyde. Its use therefore represents a marked improvement over those processes which employ complex materials such as the trihalopropionaldehydes, the substituted acroleins, and like reactants.

Whereas the fused pyrimidine-pyrazine structure is referred to as pteridine, the compound resulting from the interaction of 2,4,5-triamino-6-hydroxy-pyrimidine, propargyl aldehyde, and p-amino benzoic acid is according to conventional heterocyclic nomenclature 4-([2(-amino-4 - hydroxy - 6 - pyrimido{4,5-b}pyrazyl)methyl]amino) benzoic acid. This structure has been given the name pteroic acid and this latter simplified name will be used hereinafter to represent the acid and the term pteroyl will refer to the acid as does benzoyl to benzoic acid.

The reaction may be conducted by first combining the propargyl aldehyde with the pyrimidine or the amine and then combining the intermediate reaction product with the other reagent. Preferably, however, all three are reacted together by mixing the amine and the pyrimidine and then adding the propargyl aldehyde. The reaction may be conducted over a wide range of temperatures but is generally limited to a range of 20° C. to 80° C. for practical purposes. A range of 30° C. to 60° C. is preferred.

The reaction is generally conducted in a solvent and since it functions satisfactorily, water is preferred. Organic solvents may be employed instead and include ethanol, methanol, propanol, acetic acid, dioxane, mixtures thereof, and the like. An excess of one of the reagents, and particularly an excess of the propargyl aldehyde, may function as the reaction medium. In place of a true solvent the reaction may be effected in suspension in a liquid in which one or more of the reagents may be dissolved. Since the solvent molecules do not enter into the reaction, the use of a particular solvent is a matter of choice rather than a critical consideration.

While a wide pH range is permissible, an acid pH is preferred and best results are obtained at a pH of from 3 to 4. To this end the solution may be buffered by the addition of suitable materials. While the time of reaction may extend over a period of several hours, selection of optimum conditions may decrease this time to as little as fifteen minutes.

As a practical matter it has been found that the amine is the limiting reagent in the reaction and accordingly improved yields will result by employing the amine in substantial excess of its stoichiometric proportion.

Reference to the overall equation discloses that the formation of the 6-aminomethyl pteridine is accompanied by a loss of hydrogen atoms. These presumably pass off as water being oxidized by the air. This oxidation can be effected with no special troubles but it will be facilitated by aeration through agitation or stirring. To facilitate the conversion of the probable dihydro- intermediate, a mild oxidizing agent may be incorporated into the reaction mass.

Upon completion of the reaction, the product which is substantially water-insoluble is separated and washed. The crude product may be worked up for isolation of its active component.

The invention is illustrated in greater detail in the following examples in which the preferred products having folic acid activity are prepared. It will be understood that these examples are merely illlustrative of the practice of the invention and are not to be construed as limiting the invention to the specific condition or reactions shown.

*Example I.—Preparation of pteroyl glutamic acid*

To 500 cc. of water there are added 51.0 grams of 2,4,5-triamino-6-hydroxy-pyrimidine and 96.0 grams of p-amino benzoyl glutamic acid. The mixture is brought to a pH of 3–4 and the temperature is raised to 40–45° C. 100 cc. of glacial acetic acid containing 19.5 grams of dissolved propargyl aldehyde is added to the mixture followed by the dropwise addition of 2.0 grams of iodine in 200 cc. of potassium iodide solution. Concurrently therewith a 20% caustic soda solution is added in such amount to maintain the pH between 3 and 4. Following the additions, the temperature is maintained at 40–45° C. for 30 minutes and thereafter cooled to room temperature. 20 grams of diatomaceous earth are added and the mixture is filtered. The solids containing the active principle are washed with 200 cc. of water, 200 cc. of ethanol, and finally with acetone. This product on assay showed an activity identical with pteroyl glutamic acid prepared by a different method.

*Example II.—Preparation of pteroyl alpha glutamyl glutamic acid*

To 700 cc. of water 185.5 grams of p-amino benzoyl alpha glutamyl glutamic acid and 16.9 grams of 2,4,5-triamino-6-hydroxy-pyrimidine are added and the pH of the resulting mixture is brought to 3–4. The temperature is brought to 45–48° C. and 50 cc. of glacial acetic acid containing 5.4 grams of dissolved propargyl aldehyde are added. A solution of 5.0 grams of sodium dichromate in 50 cc. of water are added dropwise concurrently with sufficient 25% sodium hydroxide solution to maintain the pH between 3 and 4. Following all the additions the temperature is maintained at 45–50° C. for one half hour and then cooled to 20° C. After addition of 10 grams of diatomaceous earth the solution is filtered and the solids are washed successively with 200 cc. of water, 50 cc. of ethanol, and acetone. The product on assay showed an activity identical with that of pteroyl alpha glutamyl glutamic acid prepared differently.

*Example III.—Preparation of pteroyl gamma glutamyl glutamic acid*

To 700 cc. of water 185.5 grams of p-amino benzoyl gamma glutamyl glutamic acid and 16.9 grams of 2,4,5-triamino-6-hydroxy-pyrimidine are added and the pH of the resulting mixture is brought to 3–4. The temperature is brought to 45–48° C. and 50 cc. of glacial acetic acid containing 5.4 grams of dissolved propargyl aldehyde are added. A solution of 5.0 grams of sodium dichromate in 50 cc. of water are added dropwise concurrently with sufficient 25% sodium hydroxide solution to maintain the pH between 3 and 4. Following all the additions the temperature is maintained at 45–50° C. for one half hour and then cooled to room temperature. After addition of 10 grams of diatomaceous earth the solution is filtered and the solids are washed successively with 200 cc. of water, 50 cc. of ethanol, and acetone. The product on assay showed an activity identical with that of pteroyl gamma glutamyl glutamic acid prepared by a different method.

I claim:

1. A process for preparing 2-amino-4-hydroxy-6-(N-substituted)-aminomethyl-pteridines which comprises interacting 2,4,5-triamino-6-hydroxy-pyrimidine, a member of the group consisting of propargyl aldehyde and its acetals, and an amine selected from the group consisting of primary and secondary lower alkylamines, lower alkylolamines, mono-cyclic arylamines, carboxy-mono-cyclic arylamines, and amides of carboxy-mono-cyclic arylamines with an amine selected from the group consisting of ethylamine, ethanolamine, ethylhexylamine, morpholine, glutamic acid, glutamyl glutamyl glutamic acid and glutamyl glycyl glutamic acid.

2. A process for preparing a pteroyl glutamic acid which comprises interacting in a solvent at a temperature of from about 20° C. to about 80° C. 2,4,5-triamino-6-hydroxy-pyrimidine, a lower alkyl acetal of propargyl aldehyde, and p-amino-benzoyl glutamic acid.

3. A process for preparing pteroyl glutamic acid which comprises reacting in water at a temperature of from about 30° C. to about 60° C. and at a pH of about 3–4 2,4,5-triamino-6-hydroxy-pyrimidine, propargyl aldehyde, and p-amino-benzoyl glutamic acid.

4. A process for preparing pteroyl glutamyl glutamic acid which comprises reacting in water at a temperature of from about 30° C. to about 60° C. and at a pH of about 3–4 2, 4, 5-triamino-6-hydroxy-pyrimidine, propargyl aldehyde, and p-amino-benzoyl glutamyl glutamic acid.

5. In the process for preparing 2-amino-4-hydroxy-6-(N-substituted)-aminomethyl-pteridines by interacting 2,4,5-triamino-6-hydroxy-pyrimidine, an amine containing at least one hydrogen atom directly bonded to the nitrogen atom, and an aldehydic material for effecting ring closure; the improvement which comprises employing as said aldehydic material a compound selected from the group consisting of propargyl aldehyde and acetals thereof.

6. A process for preparing pteroyl glutamic acid which comprises interacting in liquid medium 2,4,5-triamino-6-hydroxy-pyrimidine, propargyl aldehyde and p-amino-benzoyl glutamic acid.

7. A process for preparing pteroyl glutamic acid which comprises interacting in liquid medium 2,4,5-triamino-6-hydroxy-pyrimidine, an acetal of propargyl aldehyde, and p-amino-benzoyl glutamic acid.

8. A process for preparing pteroyl glutamic acid which comprises interacting in a solvent at a temperature of from about 20° C. to about 80° C. 2,4,5-triamino-6-hydroxy-pyrimidine, propargyl aldehyde, and p-amino benzoyl glutamic acid.

No references cited.